United States Patent [19]

Sugawara

[11] Patent Number: 5,852,602
[45] Date of Patent: Dec. 22, 1998

[54] CREDIT CONTROL METHOD AND SYSTEM FOR ATM COMMUNICATION APPARATUS

[75] Inventor: Tsugio Sugawara, Tokyo, Japan

[73] Assignee: NEC Corporation, Tokyo, Japan

[21] Appl. No.: 787,772

[22] Filed: Jan. 29, 1997

[30] Foreign Application Priority Data

Jan. 29, 1996 [JP] Japan .................................. 8-013184

[51] Int. Cl.$^6$ ...................................................... H04J 3/14
[52] U.S. Cl. ........................ 370/231; 370/236; 370/253; 370/395; 370/410; 370/413; 370/905
[58] Field of Search .................... 370/231, 235, 370/236, 389, 395, 400, 409, 410, 412, 429, 474, 902, 912, 426, 905, 252, 253; 340/825, 825.06, 825.07

[56] References Cited

U.S. PATENT DOCUMENTS

| | | | |
|---|---|---|---|
| 4,527,267 | 7/1985 | Cohen | 370/231 |
| 5,063,562 | 11/1991 | Barzilai et al. | 370/231 |
| 5,119,372 | 6/1992 | Verbeek | 370/230 |
| 5,280,470 | 1/1994 | Buhrke et al. | 370/232 |
| 5,313,454 | 5/1994 | Bustini et al. | 370/236 |
| 5,339,332 | 8/1994 | Kammerl | 375/225 |
| 5,432,824 | 7/1995 | Zheng et al. | 370/232 |
| 5,442,624 | 8/1995 | Bonomi et al. | 370/231 |
| 5,457,687 | 10/1995 | Newman | 370/232 |
| 5,493,566 | 2/1996 | Ljungberg et al. | 370/231 |
| 5,572,523 | 11/1996 | Katsube et al. | 370/231 |

FOREIGN PATENT DOCUMENTS

| | | |
|---|---|---|
| 7-074780 | 3/1995 | Japan . |
| 9-149082 | 6/1997 | Japan . |

OTHER PUBLICATIONS

D. Hunt et al. "Credit–Based FCVC Proposal for ATM traffic Management," ATM Forum Technical Committee 94–0168R1, May, 1994.

ANSI X3T11., "High–Performance Parallel Interface–Mapping to Asynchronous Transfer Mode", American National Standard for Information Systems, Jun. 1994, pp. i–ii, 1–11.

Primary Examiner—Douglas W. Olms
Assistant Examiner—Seema S. Rao
Attorney, Agent, or Firm—Foley & Lardner

[57] ABSTRACT

In a credit control method and system, an initial credit value is sent from a receiving-side to a sending-side prior to transferring a packet. Transfer of a packet is started on the sending-side when this credit value is received. On the receiving-side, a new credit value is calculated when the packet is received, and the same number of packets as the number indicated by the calculated new credit value are received and processed. A new credit value is sent to the sending-side whenever receiving buffers whose number equals the preceding new credit value are emptied. On the sending-side, the sum of the new credit value and the initial credit value, whenever the new credit value is received, is stored as a credit value indicating the number of successively transmittable packets. The stored credit value is decremented by one on the sending-side whenever a packet is sent, and packets are continuously transferred until the credit value becomes "0" or there is no more packet to be sent. An integral new credit value $Cn$ calculated based on a condition: $Ta+Tp \times (Cn-1) < Tp \times Ci$ where $Ta$ is a time from transmission of the initial credit value to reception of the first packet on the receiving-side, $Tp$ is a time required to send one fixed-length packet, and $Ci$ is the initial credit value is $Ci$.

11 Claims, 7 Drawing Sheets

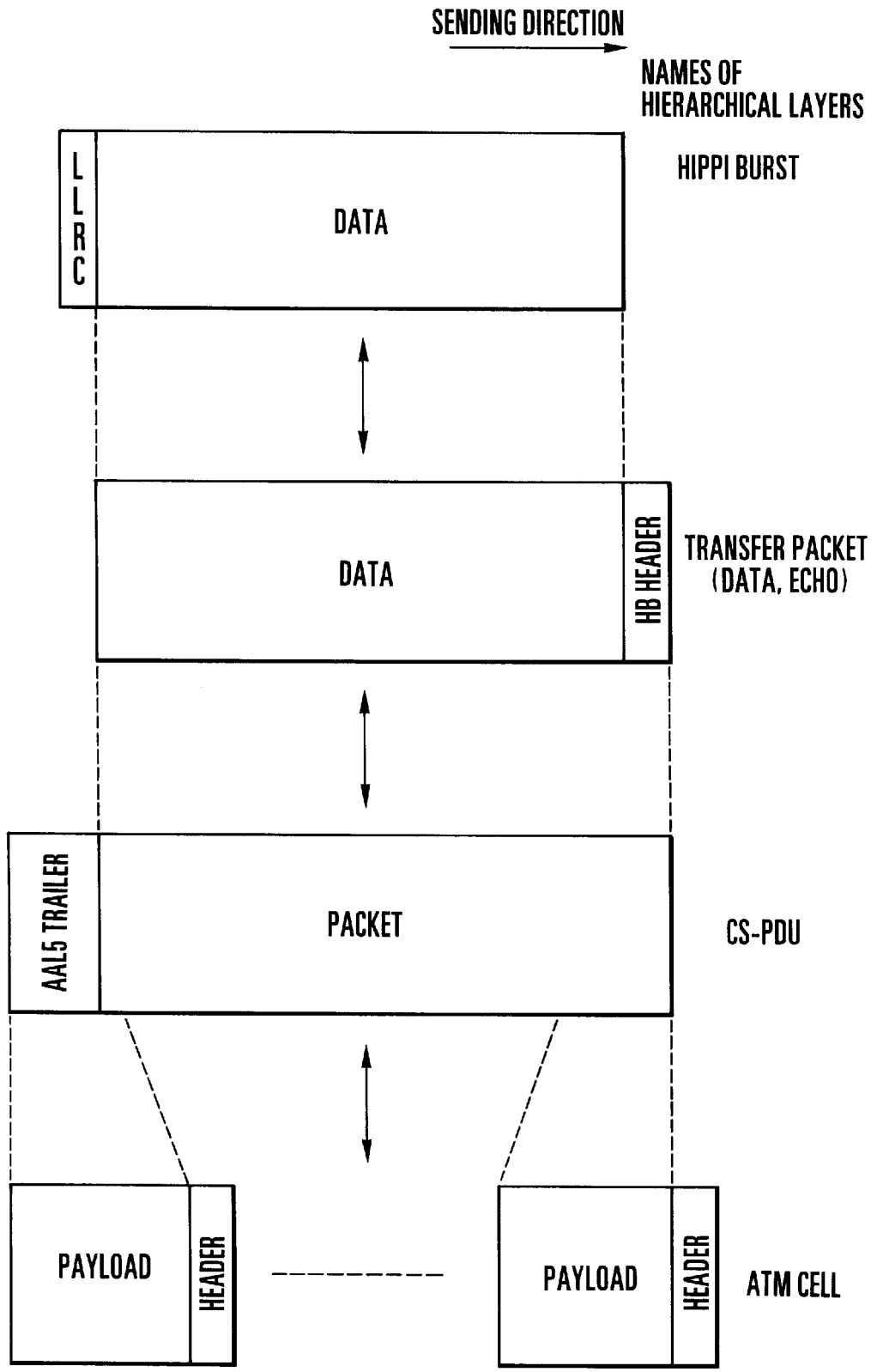
F I G. 6

CREDIT CONTROL METHOD AND SYSTEM FOR ATM COMMUNICATION APPARATUS

BACKGROUND OF THE INVENTION

The present invention relates to communication control for rapidly transferring a fixed-length data packet via a network and, more particularly, to a method and system for controlling credit in an ATM (Asynchronous Transfer Mode) communication apparatus which transfers data by flow control using credit information.

In conventional packet transfer of this sort, before communication is started, a data packet is transmitted by a method which is previously determined between a sending-side and a receiving-side. Examples of this transmission method are a method in which the sending-side sends packets at predetermined fixed intervals in accordance with the data processing speed of the receiving-side, and a method in which data packets are sent by previously determining a credit value in accordance with the data processing speed and the buffer amount of the receiving-side.

Flow control and data transfer using credit information will be described in more detail below.

FIG. 5 shows the way data transfer is performed by credit control of HIPPI (High-Performance Parallel Interface-Mapping) in an ATM recommended by ANSI (American National Standards Institute). In FIG. 5, a data sending-side which has generated a transmission request sends a connection request packet to a data receiving-side via an ATM network (step S51).

Upon receiving the connection request packet, the data receiving-side sends, if reception is possible, a packet containing an initial credit value to the sending-side (step S52). As this initial credit value, a value representing the number of buffers corresponding to the maximum number of consecutive bursts which can be received by the data receiving-side is commonly used.

When receiving the packet containing the initial credit value, the data sending-side successively sends the same number of data bursts as the number indicated by the initial credit value (step S53). In FIG. 5, each line with an arrowhead represents one data burst. Although a general HIPPI packet is composed of a plurality of bursts, one packet consists of one burst for the sake of simplicity in FIG. 5.

Whenever receiving a burst, the data receiving-side stores the burst in a buffer and processes the burst. Each time the same number of bursts as the number previously determined on the basis of the data processing speed and the buffer amount of the receiving-side are processed and buffers corresponding to the amount of the processed bursts are emptied, the data receiving-side sends on a packet the number of the processed bursts as a new credit value to the sending-side (steps S54, S56, S58, and S60). The receiving-side repeatedly performs the above operation until the transmission is completed. That is, the receiving-side receives and processes the number of bursts indicated by a new credit value and, whenever buffers corresponding to the amount of the processed bursts are emptied, sends the value as a new credit value.

Upon receiving the packet containing a new credit value, the data sending-side adds the number of untransmitted bursts contained in the initial credit value and the number indicated by the received new credit value, and stores the sum as a new credit value. By using the stored value as the number of successively transmittable bursts, the sending-side decrements the stored value by one whenever transmitting one burst and adds a new credit value to the stored value whenever receiving a new credit value, thereby transmitting bursts (steps S55, S57, S59, and S61).

Data is sequentially transferred from the sending-side to the receiving-side by repeating the above operation. When completely sending the data, the sending-side transmits a disconnection instruction packet to the receiving-side to complete the whole transmission (step S62).

In communication between apparatuses connected via, e.g., an ATM network, it is very difficult for a packet transfer technique using the conventional credit control to allow each apparatus to always perform data packet transfer with the maximum throughput of the apparatus while preventing a traffic increase of unnecessary credit control.

This is so because although the propagation delay of a packet caused when the packet passes through, e.g., an ATM network changes in accordance with the distance between the sending-side and the receiving-side, the value of credit used in packet transfer is unconditionally determined on the basis of the data processing speed and the buffer amount of the receiving-side. Consequently, the conventional credit control is unable to control a change in the optimum credit value which changes in accordance with the distance between the sending-side and the receiving-side.

Also, in the conventional credit control packet transfer, all credit values to be transmitted are fixed values. Therefore, it is difficult for the conventional credit control to control a reduction in the transfer efficiency resulting from the propagation delay of a packet which momentarily changes when the packet passes through, e.g., an ATM network.

SUMMARY OF THE INVENTION

It is a principal object of the present invention to provide a credit control method and system for an ATM communication apparatus, which can perform packet transfer with the maximum throughput regardless of the distance between apparatuses connected via, e.g., an ATM network.

It is another object of the present invention to provide a credit control method and system for an ATM communication apparatus, which can prevent a reduction in packet transfer efficiency resulting from the propagation delay of a packet which momentarily changes when the packet passes through, e.g., an ATM network.

To achieve the above objects of the present invention, there is provided a credit control method for an ATM communication apparatus for performing data transfer of a fixed-length packet from a packet sending-side to a packet receiving-side by flow control using credit information, comprising the steps of sending an initial credit value from the packet receiving-side to the packet sending-side prior to transferring a packet, starting transfer of a packet on the packet sending-side when the initial credit value is received, calculating a new credit value on the packet receiving-side when the packet is received from the packet sending-side, receiving and processing the same number of packets as the number indicated by the calculated new credit value on the packet receiving-side, sending a new credit value from the packet receiving-side to the packet sending-side whenever the same number of receiving buffers as the number indicated by the preceding new credit value are emptied, storing, on the packet sending-side, a value obtained by adding the new credit value to the initial credit value from the packet receiving-side, whenever the new credit value is received, as a credit value indicating the number of successively transmittable packets, and decrementing the stored credit value by one on the packet sending-side whenever a packet is sent and continuously transferring packets until the credit value becomes "0" or there is no more packet to be sent, wherein the step of calculating the new credit value calculates an integer new credit value Cn on the basis of a condition $$Ta+Tp\times(Cn-1)<Tp\times Ci$$

where Ta is a time from transmission of the initial credit value from the packet receiving-side to reception of the first packet on the packet receiving-side, Tp is a time required to send one fixed-length packet, and Ci is the initial credit value.

BRIEF DESCRIPTION OF THE DRAWINGS

FIG. 6 is a view of a data structure showing the packet format of a HIPPI apparatus in an ATM recommended by ANSI and the relationship between AAL5 and an ATM cell recommended by ITU-T.

DESCRIPTION OF THE PREFERRED EMBODIMENT

The principle of optimization credit control according to the present invention will be described first.

Figures 1A, 1B:
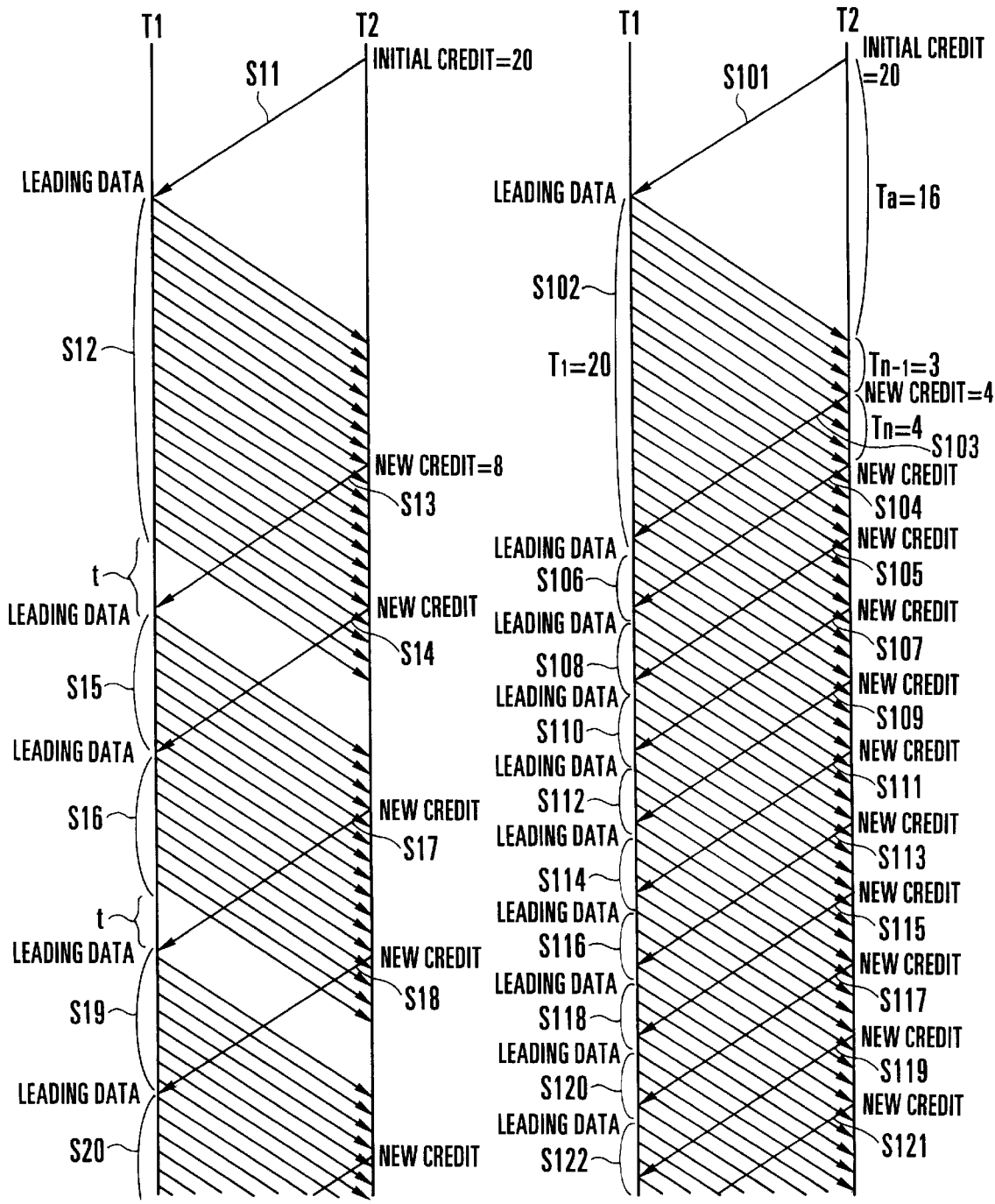
FIG. 1A is a timing chart of packet transfer performed by a conventional fixed credit control method.
FIG. 1B is a timing chart of packet transfer using a new credit value optimized by the present invention.

A new credit value is determined as follows. Assuming that a time from transmission of an initial credit value from a receiving-side to reception of the first packet is Ta, a time required to transmit one fixed-length packet is Tp, an initial credit value is Ci, and a new credit value is Cn, an integral value Cn meeting the following condition $$Ta+Tp\times(Cn-1)<Tp\times Ci \qquad (1)$$

is calculated each time packet transfer is started, and the calculated Cn value is used as a new credit value in the packet transfer. Cn obtained by condition (1) has the following meaning. That is, as indicated by a conventional control method shown in FIG. 1A and an optimization control method according to the present invention shown in FIG. 1B, Cn is a condition necessary for a new credit value sent from a packet receiving-side T2 to arrive in a packet sending-side T1 before the packet sending-side T1 completely sends the same number of packets as the number indicated by the initial credit value. If this condition is not met, as shown in FIG. 1A, packets transmitted by the initial credit value do not continue to packets transmitted by a new credit value, and the packets transmitted by the new credit value do not continue to each other. This produces a spare time during which reception is awaited, thereby decreasing the transfer efficiency.

Also, prior to starting packet transfer, the time Ta from transmission of the initial credit value from the receiving-side to the sending-side to reception of the first packet sent from the sending-side is measured, and the value of the transmission time Tp required to send one packet is calculated on the basis of the transmission rate of a communication line used and a fixed packet length. These measurement and calculation are necessary to calculate an optimum new credit value from condition (1). Since the time Ta is measured whenever the packet sending-side is changed, it is always possible to control a change in the distance between the sending- and receiving-sides and a change of the environment in the network.

In calculating the new credit value Cn, a maximum value within the range of the calculated Cn values is used as a new credit value in packet transfer. This prevents an increase in unnecessary control traffic caused by a small credit value. Consequently, it is always possible to perform packet transfer with a maximum throughput by using an optimum new credit value.

Figures 2A, 2B:
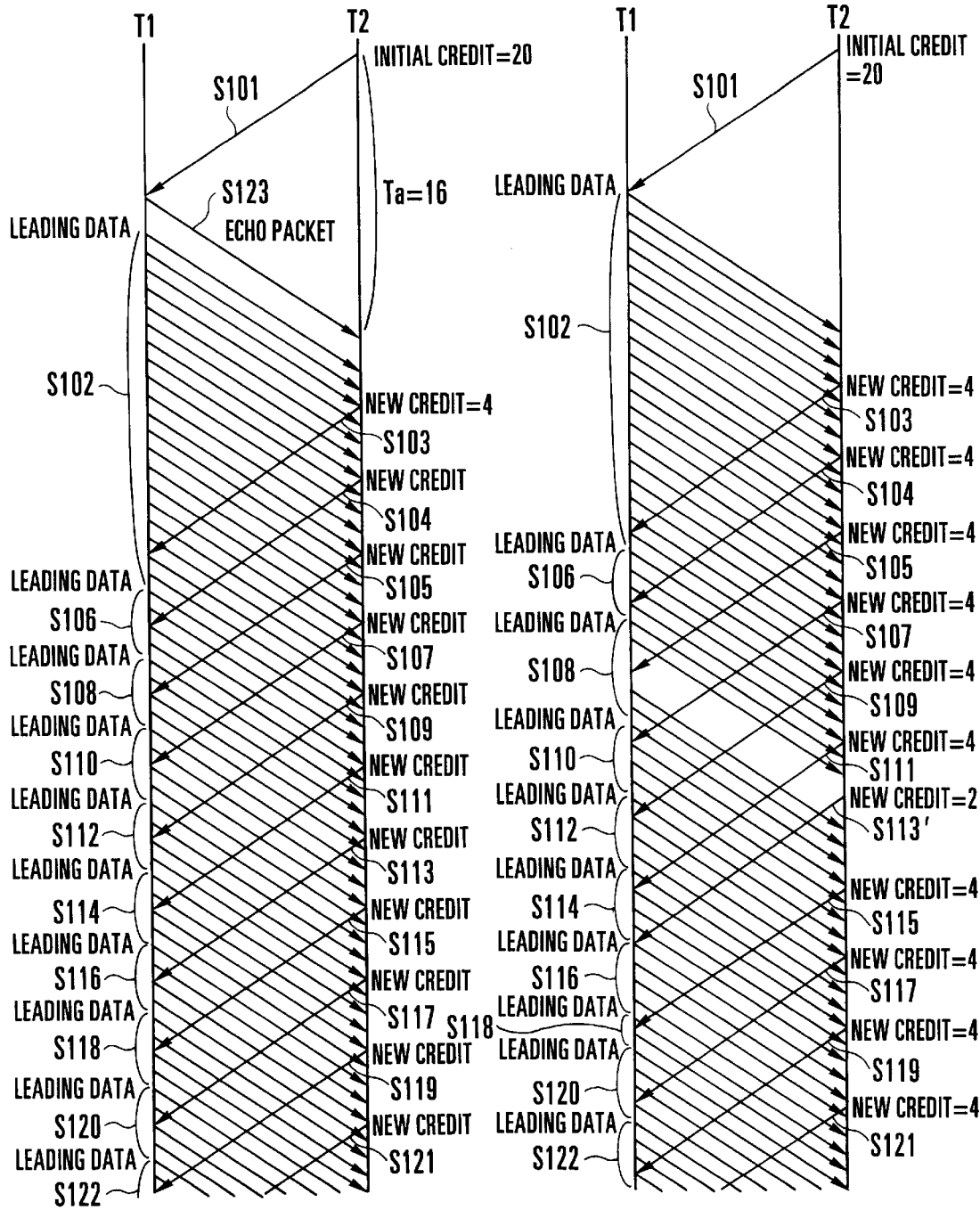
FIG. 2A is a timing chart of packet transfer according to the present invention when initial transmission data is delayed.
FIG. 2B is a timing chart of packet transfer according to the present invention when intermediate data is delayed.

If a data packet to be transmitted from the packet sending-side is not prepared when the sending-side has received the initial credit value transmitted from the receiving-side, the sending-side sends an echo packet consisting of only packet header information to the receiving-side. The receiving-side measures the time Ta before the first packet is received by observing packets including this echo packet. This prevents the transmission packet preparation time on the packet sending-side from being included in the time Ta from transmission of the initial credit value from the packet receiving-side to reception of the first packet sent from the packet sending-side. As shown in FIG. 2A, the time Ta can be almost the time originally required to send and return a packet between the sending- and receiving-sides.

If no next packet to be received arrives and no packet is currently being received when the packet receiving-side has completely processed all received packets and all receiving buffers are emptied, the receiving-side sends to the sending-side the number of received packets, which are newly processed up to the point after the immediately preceding new credit value is transmitted to the sending-side, as a temporary new credit value. When successively receiving packets after that, the receiving-side continues the communication by returning the new credit value to the value initially set in the packet transfer. That is, as shown in FIG. 2B, if the arrival of a packet is delayed for some reason during packet transfer, the packet sending-side is informed of the number of all empty buffers on the receiving-side as a temporary new credit value. This informs the latest credit value successively transmittable by the packet sending-side. Consequently, it is possible to avoid an unnecessary reduction in packet transfer efficiency at the packet sending-side caused when the sending-side waits for credit. In FIGS. 1A, 1B, 2A, and 2B, each leading data represents first packet data transmitted in accordance with an initial credit value or a new credit value received immediately before the leading data.

The present invention will be described in detail below with reference to an embodiment shown in the accompanying drawings.

Figure 3:
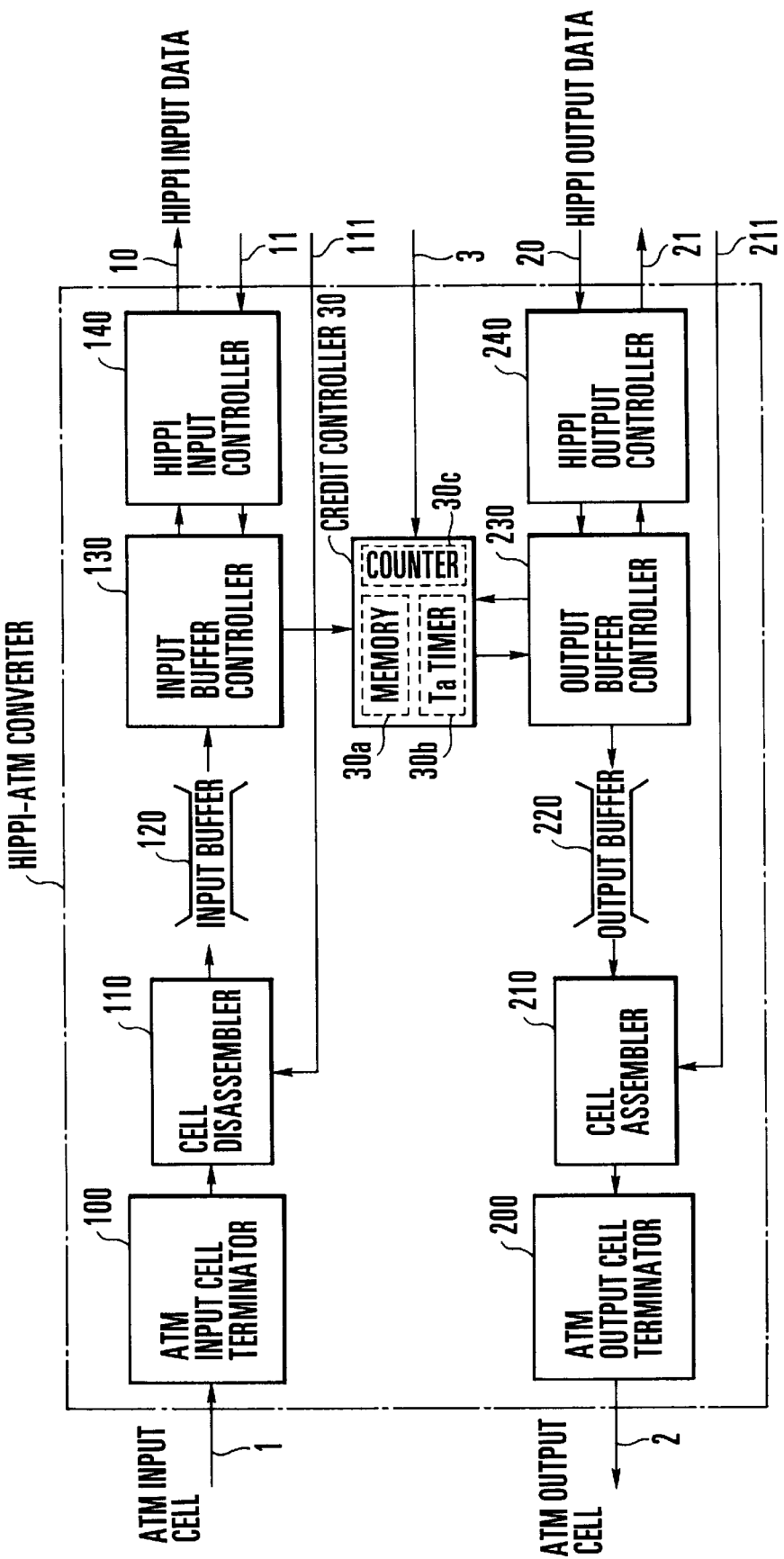
FIG. 3 is a block diagram showing functions of a HIPPI-ATM converter according to one embodiment of the present invention.

FIG. 3 shows functions of a HIPPI-ATM converter according to one embodiment of the present invention. Referring to FIG. 3, an ATM input cell 1 is input to an ATM input cell terminator 100. The ATM input cell terminator 100 terminates the ATM input cell 1 to establish cell synchronization and outputs all effective cells except empty cells to a cell disassembler 110. Of the output cells from the ATM input cell terminator 100, the cell disassembler 110 selects input cells whose cell headers' VPI (Virtual Path Identifier), VCI (Virtual Channel Identifier), and PTI (Payload Type Identifier) fields are valid, and stores payload portions of these cells.

When detecting a cell whose cell header's PTI field indicates the end of CS-PDU (Convergence Sublayer-Protocol Data Unit) of AAL5 (ATM Adaption Layer 5), the cell disassembler 110 checks AAL5 by connecting all the stored payload portions. If the check result is not abnormal, the cell disassembler 110 restores an original data packet form from which a trailer portion of AAL5 and padding data are deleted, and outputs the data packet to an input buffer 120. Valid VPI, VCI, and PTI values of cell header information checked by the cell disassembler 110 and the data length of CS-PDU of AAL5 are previously specified by a host apparatus through a signal line 111 before communication is started. The input buffer 120 writes the output data from the cell disassembler 110 in units of packets and simultaneously writes information indicating the packet length and the presence/absence of an error together with the packet data.

Each time a HIPPI input controller 140 outputs a signal, an input buffer controller 130 reads out one packet from the input buffer 120 and checks the header of the readout packet. If the readout packet is a data packet, the input buffer controller 130 outputs the packet to the HIPPI input controller 140. If the readout packet is a control packet or if the readout packet contains control data in its header although the packet is a data packet, the input buffer controller 130 outputs the control data in the header to a credit controller 30. The credit controller 30 stores in a memory 30$a$ system data including an initial credit value, a maximum new credit value, the communication rate of an ATM network to be used, and a fixed packet length informed from the host apparatus through a signal line 3 before communication is started. In this embodiment, the initial credit value and the maximum new credit value are the same value indicating the maximum number of buffers and represent the maximum number of packets which can be received and stored in an initial state.

The credit controller 30 performs necessary processing on the basis of the contents of the output control data from the input buffer controller 130 and the internal state of the HIPPI-ATM converter. If a connection request is designated while the line is not connected, the credit controller 30 instructs an output buffer controller 230 to set the initial credit value in a control packet. At the same time, the credit controller 30 activates an internal Ta timer 30$b$ of the credit controller 30 to measure the time Ta before the first packet is received from the connection request source. On the basis of the time Ta measured by the Ta timer 30$b$, the communication rate of the ATM network used, the transmission time Tp of one packet calculated from the fixed packet length, and the set value Ci of the initial credit value, the credit controller 30 calculates the new credit value Cn meeting condition (1) described above and stores the value Cn in the memory 30$a$.

Note that the decimal part of the calculated new credit value Cn is chopped to obtain an integer and the maximum value of values meeting the condition is set as the new credit value Cn in order to prevent an increase in unnecessary traffic for informing data.

Each time the input buffer controller 130 reads out a packet from the input buffer 120, the credit controller 30 is informed of this information by the input buffer controller 130. In accordance with the information from the input buffer controller 130, the credit controller 30 causes a counter 30$c$ to count the processed packets. Whenever the count of the counter 30$c$ becomes equal to the new credit value stored in the memory 30$a$, the credit controller 30 instructs the output buffer controller 230 to set the new credit value in a packet and inform the packet sending-side of the new credit value.

The output data packet from the input buffer controller 130 to the HIPPI input controller 140 is converted into a HIPPI burst by the HIPPI input controller 140. When receiving a HIPPI burst input request signal from a host HIPPI apparatus through a signal line 11, the HIPPI input controller 140 transfers the HIPPI burst to the host HIPPI apparatus through a HIPPI input data line 10.

The output buffer controller 230 which is instructed to send a packet indicating the new credit value by the credit controller 30 generates a control packet and writes the generated packet in an output buffer 220. The output buffer controller 230 selectively adds the new credit value to control data in the header of a data packet requested to be sent to the same destination by a HIPPI output controller 240, and writes the data in the output buffer 220.

The HIPPI output controller 240 converts the HIPPI burst received from the host HIPPI apparatus through a HIPPI output data line 20 into a data packet and outputs the data packet to the output buffer controller 230. The up and down links of the interface between the HIPPI output controller 240 and the host HIPPI apparatus are opposite to those of the interface between the HIPPI input controller 140 and the host HIPPI apparatus.

A cell assembler 210 reads out the packets written in the output buffer 220 one by one and divides each packet into a plurality of cells. Thereafter, the cell assembler 210 adds a header to each cell and outputs the cell to an ATM cell terminator 200. The ATM output cell terminator 200 transmits an ATM output cell 2 output from the cell assembler 210. Similar to the cell disassembler 110, the cell assembler 210 is previously informed of the VPI, VCI, and PTI values of cell header information and the data length of CS-PDU of AAL5 from the host apparatus through a signal line 211.

If the input control data from the input buffer controller 130 indicates reception of the initial credit value, the credit controller 30 stores the received initial credit value as a credit value indicating the number of successively transmittable packets in a storage area of the memory 30$a$ other than storage areas for the system data including the initial credit and for the new credit value. At the same time, the credit controller 30 instructs the output buffer controller 230 to transmit a data packet.

When instructed to transmit a data packet by the credit controller 30, the output buffer controller 230 sends a transmission packet request signal to the HIPPI output controller 240. Upon receiving the transmission packet request signal, the HIPPI output controller 240 outputs to the host HIPPI apparatus through a signal line 21 an output request signal for a HIPPI burst to be transmitted. When the host HIPPI apparatus sends the HIPPI burst onto a HIPPI output data line 20, the HIPPI output controller 240 converts the HIPPI burst into a data packet and outputs the data packet to the output buffer controller 230. The output buffer controller 230 writes the received data packet in the output buffer 220 and simultaneously sends a packet write completion signal to the credit controller 30, thereby requesting the credit controller 30 to decrement by one the credit value of the memory 30$a$, which indicates the number of successively transmittable packets.

The activation timing of the Ta timer 30$b$ is such that, strictly, the credit controller 30 activates the Ta timer 30$b$ to start the Ta measurement when the output buffer controller 230 sends the packet write completion signal to the credit controller 30.

If the output control data from the input buffer controller 130 indicates reception of a new credit value, the credit controller 30 adds the received new credit value and the credit value of the memory 30a to obtain a new credit value and stores this new credit value in the memory 30a. Consequently, the number of successively transmittable packets is updated.

If the output control data from the input buffer controller 130 is the initial credit value, transmission of a data packet can be delayed to an extent which cannot be neglected. That is, even when the HIPPI output controller 240 outputs a transmission HIPPI burst transfer request signal to the host HIPPI apparatus through the signal line 21, there is sometimes a long waiting time period after the output buffer controller 230 sends a transmission packet request signal to the HIPPI output controller 240 and before the HIPPI output controller 240 outputs a data packet. The credit controller 30 monitors the time after the credit controller 30 instructs the output buffer controller 230 to transmit a data packet and before the output buffer controller 230 returns the packet write completion signal. Accordingly, if the delay time exceeds an allowable value as in this case, the credit controller 30 instructs the output buffer controller 230 to send an echo packet composed of only packet header information, thereby decreasing the measurement error of Ta.

During communication after the credit controller 30 is informed of reception of the first output data packet from the input buffer controller 130, if the control data from the input buffer controller 130 informs that the input buffer 120 is empty, the credit controller 30 monitors the duration of this empty state of the input buffer 120. If the duration of the empty state exceeds an allowable value, the credit controller 30 instructs the output buffer controller 230 to transmit a packet containing, as a temporary new credit value, the number of packets processed immediately after the credit controller 30 instructs the output buffer controller 230 to transmit a packet indicating the new credit value, i.e., the count of the counter 30c. Simultaneously, the credit controller 30 clears the count of the counter 30c and returns the new credit value to the initial value obtained when the packet transfer is started.

The operation of the HIPPI-ATM converter described above will be described in detail below with reference to FIGS. 1A, 1B, 2A, 2B, 4A, and 4B.

FIG. 1A shows, for comparison, the way packets are transferred by conventional credit control. In FIGS. 1A, 1B, 2A, and 2B, the step of transmitting and receiving the first connection request packet in the sequence shown in FIG. 5 is omitted, and a description begins from the immediately succeeding step of transmitting an initial credit value.

FIG. 1A shows a packet transfer operation when an initial credit value is "20" and a new credit value is "8". In FIG. 1A, a sending-side T1 sends a packet to a receiving-side T2 via a network in accordance with a conventional method using a fixed new credit value. Referring to FIG. 1A, in step S11, a packet containing the initial credit value "20" is sent from the receiving-side T2 to the sending-side T1. In step S12, the same number of data packets as the number indicated by the initial credit value are sent from the sending-side T1 to the receiving-side T2. In steps S13, S14, S17, and S18, a control packet containing the new credit value "8" is sent from the receiving-side T2 to the sending-side T1. In steps S15, S16, S19, and S20, the same number of data packets as the number indicated by the new credit value are sent from the sending-side T1 to the receiving-side T2.

Figure 5:
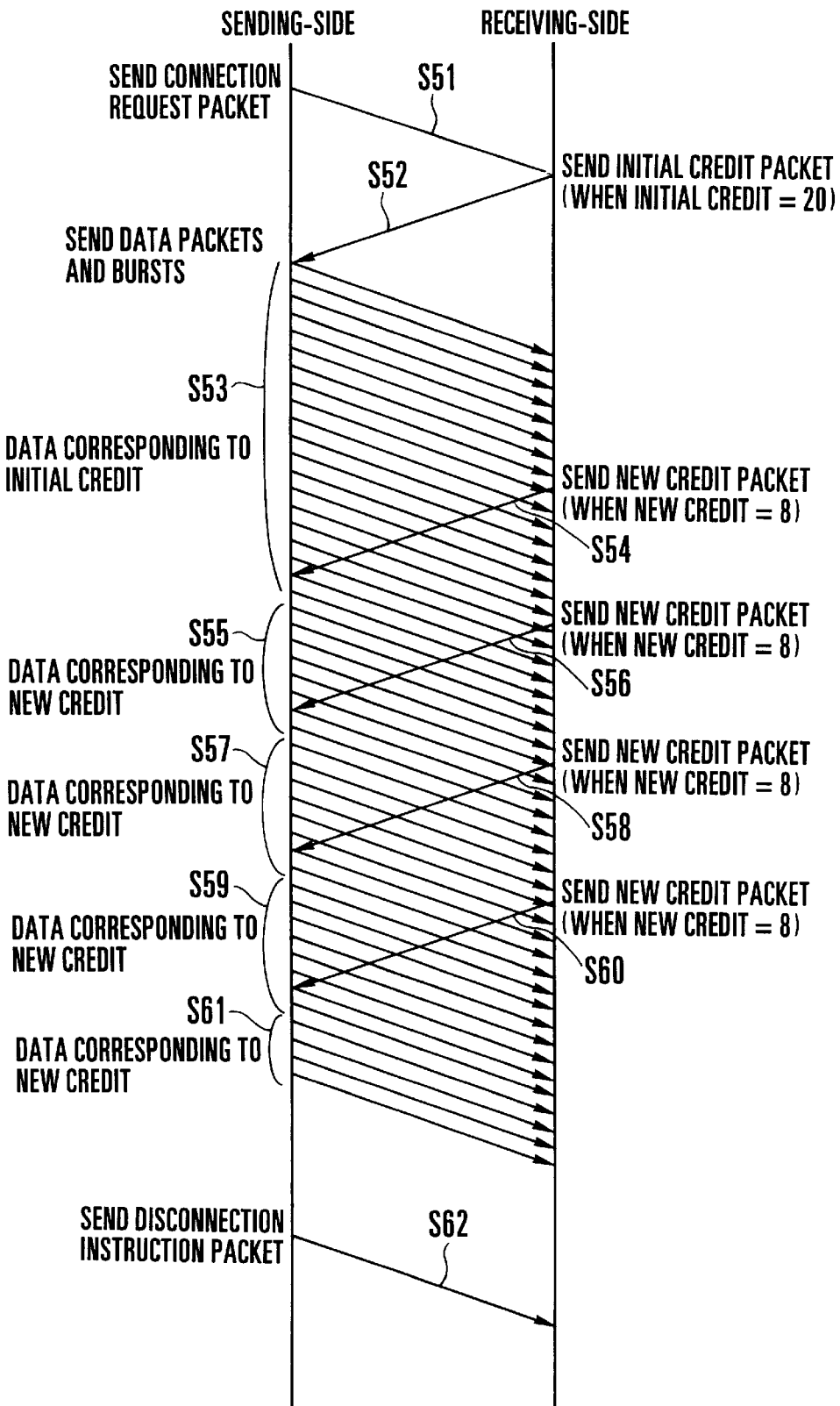
FIG. 5 is a timing chart for explaining data transfer performed by conventional credit control.

A delay in the network in the method shown in FIG. 1A is longer than the method shown in FIG. 5. Consequently, spare times t in which transfer packets are discontinuous are produced, and this significantly decreases the packet transfer efficiency. This is because the new credit value is fixed to "8". That is, an increase in delay in the network delays the information of the new credit value from the receiving-side T2 to the sending-side T1. As a consequence, the packet sending-side T1 waits for packet transfer until the new credit value is sent.

FIG. 1B shows a packet transfer operation performed at the maximum transfer efficiency by obtaining an optimum new credit value by the method of the present invention and using the obtained optimum new credit value. Similar to FIG. 1A, FIG. 1B shows a case where an initial credit value is "20" and the sending-side T1 sends packets to the receiving-side T2 via a network. Referring to FIG. 1B, in step S101, the receiving-side T2 sends a control packet containing the initial credit value "20" to the sending-side T1. In step S102, the sending-side T1 sends the same number of data packets as the number indicated by an initial credit value to the receiving-side T2. In steps S103 to S105, S107, S109, S111, S113, S115, S117, S119, and S121, the receiving-side T2 sends a control packet containing a new credit value "4" to the sending-side T1. In steps S106, S108, S110, S112, S114, S116, S118, S120, and S122, the sending-side T1 sends the same number of data packets as the number indicated by the new credit value to the receiving-side T2. A condition by which an optimum new credit value is calculated is represented by condition (1).

Assume that in FIG. 1B, a normalized value of the packet turnaround time Ta from transmission of the initial credit value and reception of the first packet is measured to be "16" when the transmission time Tp of a fixed-length packet is normalized to "1". Since initial credit value Ci=20, condition (1) is rewritten as follows.

$$16+Cn-1<20$$

Therefore, $$Cn<5$$

Consequently, Cn=4 is obtained as the maximum value of Cn.

FIG. 1B shows a packet transfer operation performed under exactly the same conditions as in FIG. 1A except that new credit value=4 obtained by the above method is used. The packet transfer operation is performed with the maximum transfer efficiency as in FIG. 5 even when the delay condition of the network changes. Note that $1 \leq Cn \leq 4$ is possible as the value of Cn meeting condition (1) and the transfer efficiency remains the same maximum efficiency even when Cn is decreased. This results in the adverse effect that as the value of Cn decreases, the control traffic for informing a new credit value increases.

FIG. 2A shows a case wherein no data packet to be transmitted is prepared when the packet sending-side T1 has received an initial credit value in calculating an optimum new credit value by the above method. In this case, transmission of a packet from the sending-side T1 is delayed. Therefore, the sending-side T1 sends an echo packet, instead of a data packet, to the receiving-side T2 (step S123) and the packet turnaround time Ta is measured, thereby calculating an optimum new credit value "4". As shown in FIG. 2A, the packet turnaround time Ta is measured by using an echo packet instead of a data packet received first. As a consequence, an optimum new credit value for data packet transfer can be set even if the start of data transmission is delayed. Steps S101 to S122 are the same steps as in FIG. 1B and a detailed description thereof will be omitted.

The optimum new credit value calculation method shown in FIG. 2A is the same as in FIG. 1B and the transfer efficiency is also the same maximum transfer efficiency as in FIG. 1B. When an echo packet is used, however, this echo packet is also counted as a packet which uses the receiving buffer. Therefore, as shown in FIG. 2A, all packets for informing the new credit value which are sent from the packet receiving-side T2 to the packet sending-side T1 are transmitted at a timing earlier by one packet than in FIG. 1B.

In this phenomenon occurring when an echo packet is used, a new credit value seems to be smaller by one than an actual value only when the first new credit value is informed. However, the second and subsequent new credit value informing packets are merely shifted forward by one packet from those in FIG. 1B, and there is no increase in the control traffic. Accordingly, there is no adverse effect.

FIG. 2B explains a packet transfer operation when the arrival of a packet to the receiving-side T2 is delayed for some reason in the middle of packet transfer using the optimum new credit value shown in FIG. 1B and an empty area is formed in the receiving buffer. In this embodiment, when an empty area in the receiving buffer is detected, the packet sending-side T1 is informed of the number of received packets, which are newly processed up to the point immediately after a control packet informing a new credit value is transmitted, as a temporary new credit value. In FIG. 2B, two packets are received and processed after the immediately preceding new credit value is transmitted, so "2" is the temporary new credit value. Accordingly, as shown in FIG. 2B, when two empty areas in the receiving buffer are detected, "2" is transmitted as a new credit value (step S113'), and the flow returns the operation of new credit value=4 as an optimum new credit value to continue the communication. Steps S101 to S112 and S114 to S122 are the same as in FIG. 1B and a detailed description thereof will be omitted.

In FIG. 2B, the operation seems to be initially delayed at the sending-side T1. Generally, however, the operation can sometimes be delayed in the network. Therefore, the packet receiving-side T2 constantly informs the packet sending-side T1 of the number of empty buffers. This prevents a reduction in packet transfer efficiency caused when the packet sending-side T1 waits for a new credit value.

Figure 4A:
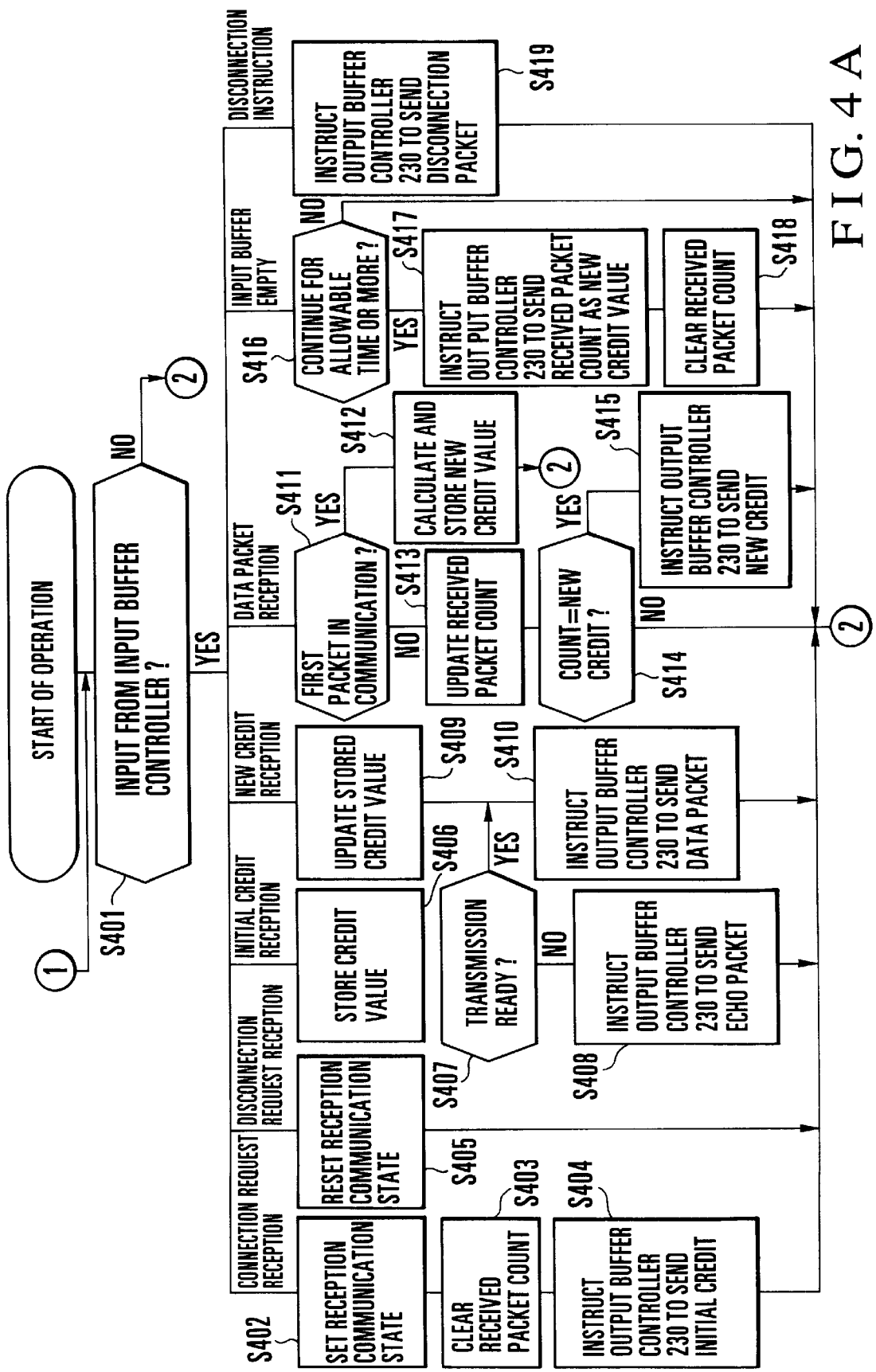
FIGS. 4A and 4B are flow charts for explaining the operation of a credit controller 30 shown in FIG. 3.
Figure 4B:
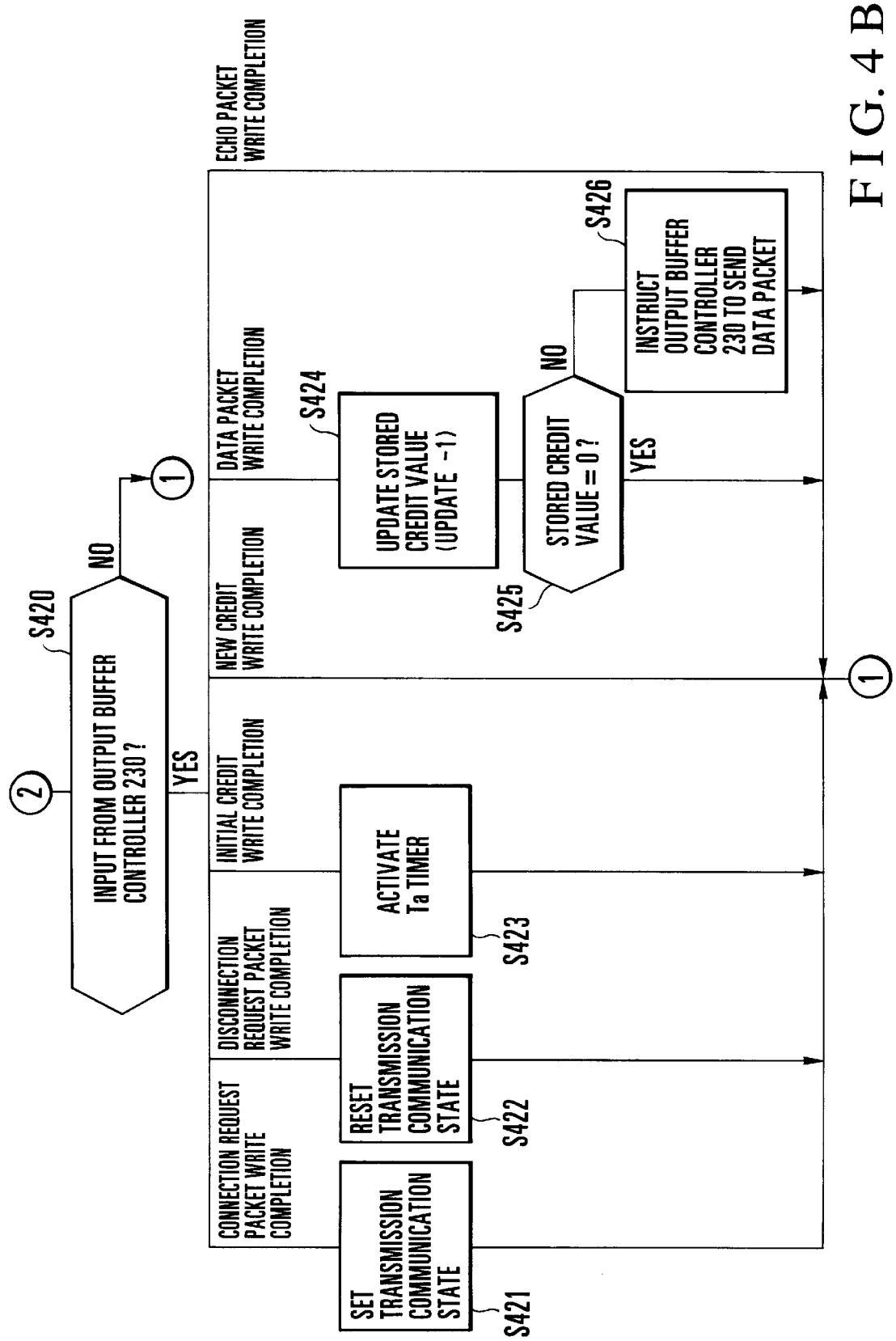

FIGS. 4A and 4B totally explain the operation of the credit controller 30 shown in FIG. 3. Since the credit controller 30 independently controls the transmission and reception of data packets, the transmission and reception operations have been separately explained. In effect, however, as shown in the flow charts of FIGS. 4A and 4B, the credit controller 30 performs a full-duplex operation in which transmission and reception are completely fused.

In FIGS. 4A and 4B, the credit controller 30 first checks the presence/absence and type of input control data from the input buffer controller 130 (step S401). If the control input is reception of a connection request, the credit controller 30 sets receiving communication mode (step S402) and clears the counter 30c for counting received packets (step S403). Subsequently, the credit controller 30 instructs the output buffer controller 230 to send initial credit (step S404), and the flow advances to step S420.

If the control input is reception of a disconnection request, the credit controller 30 resets the reception communication state (step S405), and the flow advances to step S420.

If the control input is reception of initial credit, the credit controller 30 stores the initial credit value as a credit value indicating the number of successively transmittable packets in the memory 30a (step S406), and checks whether transmission is immediately possible (step S407). If transmission is impossible, the credit controller 30 instructs the output buffer controller 230 to send an echo packet (step S408), and the flow advances to step S420.

If the control input is reception of new credit, the credit controller 30 adds the credit values stored in the memory 30a (step S409) and instructs the output buffer controller 230 to send a data packet (step S410), and the flow advances to step S420. If transmission is immediately possible in step S407, the flow advances to step S410.

If the control input is reception of a data packet, the credit controller 30 checks whether the data packet is the first data packet of the communication S411). If the data packet is the first data packet, the credit controller 30 calculates a new credit value and stores the calculated new credit value in the memory 30a (step S412), and the flow advances to step S420. If the data packet is not the first data packet in step S411, the credit controller 30 updates the count of the received packets in the counter 30c (step S413) and checks whether the count of the counter 30c equals the new credit value in the memory 30a (step S414). If the two values equal, the credit controller 30 instructs the output buffer controller 230 to send new credit (step S415), and the flow advances to step S420. If the two values are not equal in step S414, the flow immediately advances to step S420.

If the control input informs that empty areas are formed in the input buffer, the credit controller 30 checks whether these empty areas continue for an allowable time or more (step S416). If the empty areas continue for the allowable time or more, the credit controller 30 instructs the output buffer controller 230 to send temporary new credit consisting of the received packet count of the counter 30c (step S417). Subsequently, the credit controller 30 clears the count of the counter 30c, and the flow advances to step S420. If the empty areas do not continue for the allowable time, the flow immediately advances to step S420.

If the control input is a disconnection instruction, the credit controller 30 instructs the output buffer controller 230 to send a disconnection packet (step S419), and the flow advances to step S420. If nothing is input in step S401, the flow advances to step S420.

In step S420, the credit controller 30 checks the presence/absence and type of input from the output buffer controller 230. If the input is write completion of a connection packet, the credit controller 30 sets a transmission communication state (step S421), and the flow returns to step S401. If the input is disconnection request packet write completion, the credit controller 30 resets the transmission communication state (step S422), and the flow returns to step S401. If the input is initial credit write completion, the credit controller 30 activates the Ta timer 30b (step S423), and the flow returns to step S401. If the input is write completion of new credit, the flow immediately returns to step S401.

If the input is write completion of a data packet, the credit controller 30 updates the stored credit value in the memory 30a, i.e., decrements the credit value by one (step S424), and checks whether the credit value in the memory 30a is zero (step S425). If the credit value is not zero, the credit controller 30 instructs the output buffer controller 230 to send a packet (step S426), and the flow returns to step S401. If the credit value is zero in step S425, the flow immediately returns to step S401. If the input is write completion of an echo packet, the flow immediately returns to step S401. Also, if nothing is input in step S420, the flow returns to step S401.

FIG. 6 is a reference material showing the relationship between a packet format and an ATM cell of a HIPPI apparatus in an ATM recommended by ANSI according to this embodiment, and the relationship between AAL5 and an ATM cell recommended by ITU-T. Note that an echo packet used is either a data packet in which a data portion consists of invalid data or a short packet composed of only an HB header and having no data portion.

According to the present invention as has been described above, an apparatus connected to, e.g., an ATM network to perform data transfer by flow control using credit information calculates an optimum credit value, whenever a connection is established, in accordance with the turnaround time required to send and return a packet between the apparatus and the communication partner, the packet length to be transmitted and received, and the communication rate, and performs packet transfer by using the calculated credit. Accordingly, packet transfer can be constantly performed with the maximum throughout regardless of the distance between the apparatus and the communication partner.

Also, since the maximum value of the calculated optimum credit values is used, transfer of control traffic for credit control is minimized while the data communication efficiency is held maximum. This makes the control very effective to prevent an increase of unnecessary control traffic in the network.

Additionally, when a connection is to be established with respect to an apparatus requiring a data preparation time at the beginning of data transfer, if no data is prepared in measuring the turnaround time of a packet, the packet turnaround time can be accurately measured by using an echo packet having no data. This constantly allows packet transfer with the maximum throughput.

Furthermore, it is possible to avoid a reduction in transfer efficiency caused by a change in propagation delay time which momentarily changes when a packet passes through, e.g., an ATM network. That is, if a receiving buffer is emptied upon reception of one packet and still the next packet cannot be received, the number of received packets which are newly processed up to the point after the immediately preceding credit value is transmitted is sent as a temporary credit value to the sending-side without waiting for completion of reception of the same number of packets as the number by the credit. In this manner, the sending-side is informed of the latest empty buffer amount on the receiving-side. This prevents a reduction in transfer efficiency caused when the packet sending-side waits for credit.

What is claimed is:

1. A credit control method for an ATM communication apparatus for performing data transfer of a fixed-length packet from a packet sending-side to a packet receiving side by flow control using credit information, comprising:

sending an initial credit value from said packet receiving-side to said packet sending-side prior to transferring a packet;

starting transfer of a packet on said packet sending-side when the initial credit value is received;

calculating a new credit value on said packet receiving-side when the packet is received from said packet sending-side;

receiving and processing the same number of packets as the number indicated by the calculated new credit value on said packet receiving-side;

sending a new credit value from said packet-receiving side to said packet sending side whenever a number of receiving buffers, equal to a number indicated by the preceding new credit values, are emptied;

storing, on said packet-sending side, a value obtained by adding the new credit value to the initial credit value from said packet receiving side, whenever the new credit value is received, as a credit value indicating the number of successively transmittable packets; and decrementing the stored credit value by one on said packet sending-side whenever a packet is sent and continuously transferring packets until the credit value becomes "0" or there are no more packets to be sent, wherein the step of calculating the new credit value calculates an integer new credit value Cn on the basis of a condition $$Ta+Tp\times(Cn-1)<Tp\times Ci$$

where Ta is a time from transmission of the initial credit value from said packet receiving-side to reception of a first packet on said packet-receiving side, Tp is a time required to send one fixed-length packet, and Ci is the initial credit value.

2. A method according to claim 1, wherein the step of calculating the new credit value comprises the steps of:

measuring the time Ta from transmission of the initial credit value from said packet receiving-side to reception of the first packet sent from said packet sending-side; and calculating a transmission rate of a communication line used and the transmission time Tp required to send one fixed-length packet.

3. A method according to claim 1, wherein the step of calculating the new credit value comprises the step of selecting a maximum value within a range meeting the condition as the new credit value Cn.

4. A method according to claim 1, further comprising the step of sending an echo packet consisting of only packet header information to said packet receiving-side if no data packet to be sent is prepared on said packet sending-side when the initial credit value is received and transmission of a packet is delayed, and wherein the step of calculating the new credit value comprises calculating the new credit value Cn by using the time Ta from transmission of the initial credit value to reception of the echo packet as the first packet received by said packet receiving-side.

5. A method according to claim 1, further comprising the steps of:

processing all packets received by said packet receiving-side and, if no packet is received from said packet sending-side although all receiving buffers are emptied, sending to said packet sending-side the number of the received packets, which are newly processed after the immediately preceding new credit value is sent to said packet sending-side, as a temporary new credit value; and continuing the communication by returning the temporary new credit value to the new credit value Cn calculated when the packet transfer is started, if packets are successively received after the temporary new credit valve is sent.

6. A credit control system for an ATM communication apparatus for performing data transfer of a fixed-length packet from a packet sending-side to a packet receiving-side by flow control using credit information, wherein said packet sending-side comprises:

packet transfer means for starting transfer of a packet to said packet receiving-side in response to an initial credit value sent from said packet receiving-side;

first storage means for storing a value obtained by adding a new credit value to the initial credit value from said packet receiving-side, whenever the new credit value is received, as a credit value indicating the number of successively transmittable packets; and transfer control means for decrementing by one the credit value stored in said storage means whenever a packet is sent and completing the packet transfer when the credit value becomes "0" or there are no more packets to be sent, said packet receiving-side comprises:

initial credit sending means for sending the initial credit value to said packet sending-side prior to transfer of a packet from said packet sending-side;

new credit calculating means for calculating a new credit value when receiving a packet sent from said packet sending-side in response to the initial credit;

receiving buffers for receiving a number of packets equal to the number indicated by the new credit value calculated by said new credit calculating means; and new credit sending means for sending a new credit value to said packet sending-side whenever a number of said receiving buffers equal to the number indicated by the new credit value are emptied in accordance with processing of the packets, and said new credit calculating means calculates an integer new credit value Cn on the basis of a condition $$Ta + Tp \times (Cn-1) < Tp \times Ci$$

where Ta is a time from transmission of the initial credit value from said packet receiving-side to reception of a first packet on said packet receiving-side, Tp is a time required to send one fixed-length packet, and Ci is the initial credit value.

7. A system according to claim 6, wherein said new credit calculating means selects a maximum value within a range meeting the condition as the new credit value Cn.

8. A system according to claim 6, wherein said packet transfer means comprises echo packet sending means for sending an echo packet consisting of only packet header information if no data packet to be sent is prepared when the initial credit value is received and transmission of a packet is delayed, and said new credit calculating means calculates the new credit value Cn by using the time Ta from transmission of the new credit value to reception of the echo packet as the first packet received.

9. A system according to claim 6, wherein said new credit sending means processes all received packets, sends to said packet sending-side the number of the received packets, which are newly processed after the immediately preceding new credit value is sent to said packet sending-side, as a temporary new credit value if no packet is received from said packet sending-side although said receiving buffers are completely emptied, and continues the communication by returning the temporary new credit value to the new credit value Cn calculated when the packet transfer is started if packets are successively received after the temporary new credit value is sent.

10. A system according to claim 6, wherein said packet receiving-side comprises second memory means for storing a new credit value calculated by said new credit calculating means and count means for counting the number of processed received packets, and said new credit sending means sends a new credit value to said packet sending-side if the new credit stored in said second memory means equals the count of said count means.

11. A system according to claim 6, wherein said packet receiving-side comprises timer means for measuring the time Ta from transmission of the initial credit value to said packet sending-side to reception of the first packet from said packet sending-side, and said new credit calculating means calculates a new credit value by using the measurement value of said timer means.

* * * * *